United States Patent
Marocchini et al.

(10) Patent No.: US 10,450,961 B2
(45) Date of Patent: Oct. 22, 2019

(54) WINDMILL BYPASS WITH SHUTOFF SIGNAL

(71) Applicant: Hamilton Sundstrand Corporation, Charlotte, NC (US)

(72) Inventors: Francis P. Marocchini, Somers, CT (US); Aaron F. Rickis, Feeding Hills, MA (US); Elise N. Zimmerman, West Hartford, CT (US); Gerald P. Dyer, Suffield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 464 days.

(21) Appl. No.: 15/186,041

(22) Filed: Jun. 17, 2016

(65) Prior Publication Data
US 2017/0363008 A1    Dec. 21, 2017

(51) Int. Cl.
*F02C 7/232* (2006.01)
*F01D 21/02* (2006.01)
*F02C 7/22* (2006.01)
*F02C 9/26* (2006.01)
*F02C 9/36* (2006.01)
*F02C 9/46* (2006.01)

(52) U.S. Cl.
CPC .............. *F02C 7/232* (2013.01); *F01D 21/02* (2013.01); *F02C 7/222* (2013.01); *F02C 9/263* (2013.01); *F02C 9/36* (2013.01); *F02C 9/46* (2013.01); *F05D 2220/32* (2013.01); *F05D 2260/606* (2013.01); *F05D 2270/021* (2013.01)

(58) Field of Classification Search
CPC .. F02C 7/22; F02C 7/222; F02C 7/232; F02C 7/236; F02C 9/26; F02C 9/263; F02C 9/36; F02C 9/46; F02C 9/32; F02C 9/28; F02C 9/38; F05D 2260/606; F05D 2270/021; F05D 2270/09; F01D 21/02
See application file for complete search history.

(56) References Cited

U.S. PATENT DOCUMENTS

| 3,129,643 | A | | 4/1964 | Porter et al. | |
|---|---|---|---|---|---|
| 3,964,253 | A | * | 6/1976 | Paduch | F02C 7/26 60/790 |
| 4,449,359 | A | | 5/1984 | Cole et al. | |
| 4,578,945 | A | * | 4/1986 | Peck | F02C 9/26 60/39.281 |

(Continued)

OTHER PUBLICATIONS

Extended European Search Report for EP Application No. 17176322.0, dated Oct. 30, 2017, 8 pages.

*Primary Examiner* — Alain Chau
(74) *Attorney, Agent, or Firm* — Kinney & Lange, P.A.

(57) ABSTRACT

A gas turbine engine shut-down system includes a pump configured to draw a flow of fuel from a source, a fuel nozzle configured to receive the flow of fuel from the pump, a fuel shut-off valve in fluid communication with the pump, a recirculation circuit for circulating excess fuel to a location upstream of the pump; a solenoid valve in communication with the pump and the recirculation circuit; and a fuel-bypass valve. The fuel-bypass valve includes a first opening connected to the fuel pump, a second opening connected to the fuel shut-off valve, a third opening connected to the recirculation circuit, a fourth opening connected to the solenoid valve, and a piston disposed within the fuel-bypass valve and movable between a plurality of positions.

16 Claims, 4 Drawing Sheets

(56) References Cited

U.S. PATENT DOCUMENTS

| | | | | |
|---|---|---|---|---|
| 4,602,479 | A | 7/1986 | Hansen | |
| 6,135,135 | A * | 10/2000 | Futa, Jr. | F02C 7/232 |
| | | | | 137/115.03 |
| 6,328,056 | B1 * | 12/2001 | Kumar | F02C 7/232 |
| | | | | 137/115.09 |
| 6,381,946 | B1 * | 5/2002 | Wernberg | F02C 9/263 |
| | | | | 60/39.281 |
| 6,401,446 | B1 * | 6/2002 | Gibbons | F02C 9/38 |
| | | | | 60/39.281 |
| 6,619,027 | B1 | 9/2003 | Busch | |
| 8,991,148 | B2 * | 3/2015 | Dore | F02C 9/38 |
| | | | | 60/39.281 |
| 9,194,291 | B2 | 11/2015 | Podgorski et al. | |
| 2002/0184884 | A1 | 12/2002 | McCarty | |
| 2003/0140613 | A1 * | 7/2003 | Dyer | F02C 9/263 |
| | | | | 60/39.281 |
| 2005/0066648 | A1 * | 3/2005 | Dalton | F01D 21/02 |
| | | | | 60/39.281 |
| 2005/0279079 | A1 * | 12/2005 | Baryshnikov | F02C 7/232 |
| | | | | 60/39.094 |
| 2016/0305338 | A1 * | 10/2016 | Chapski | F01D 21/02 |

\* cited by examiner

WINDMILL BYPASS WITH SHUTOFF SIGNAL

BACKGROUND

In a gas turbine engine it may be necessary to quickly shut down the engine. For example, if a shaft of the gas turbine engine is spinning too fast the shaft can undergo a shaft shear event. During a shaft shear event, the shaft can rub against adjacent structures within the gas turbine engine. This can cause damage to the shaft as well as surrounding components of the gas turbine engine that the shaft rubs against.

One way to shut-down the gas turbine engine is to use a series of valves to cut the supply of fuel to the nozzles. A problem with using a series of valves, however, is that the shut-down system becomes more complex and the additional valves add to the system's overall weight. Accordingly, there is a need for a simple shut-down system that can quickly shut down a gas turbine engine.

SUMMARY

A fuel management system includes a fuel source, a pump in communication with the fuel source, a shut-off valve in communication with the pump, a fuel nozzle in communication with and downstream from the shut-off valve, and a bypass valve in communication with the pump and the shut-off valve. The bypass valve includes a first chamber, a second chamber, a piston disposed between the first chamber and the second chamber and having a first end a second end and movable between a first position, a second position, and a third position, a first opening in communication with the pump and the first chamber, a second opening in communication with the shut-off valve and the first chamber, a third opening in communication with the pump and the first chamber; and a fourth opening in communication with the second chamber; and a solenoid valve in communication with the fourth opening.

A gas turbine engine shut-down system includes a pump configured to draw a flow of fuel from a source, a fuel nozzle configured to receive the flow of fuel from the pump, a fuel shut-off valve in fluid communication with the pump, a recirculation circuit for circulating excess fuel to a location upstream of the pump; a solenoid valve in communication with the pump and the recirculation circuit; and a fuel-bypass valve. The fuel-bypass valve includes a first opening connected to the fuel pump, a second opening connected to the fuel shut-off valve, a third opening connected to the recirculation circuit, a fourth opening connected to the solenoid valve, and a piston disposed within the fuel-bypass valve and movable between a plurality of positions.

A method for controlling a flow of fuel in a gas turbine engine includes pressurizing a flow of fuel with a pump, supplying the flow of fuel at a first pressure from the pump to a metering valve, supplying a first portion of the flow of fuel from the metering valve to a recirculation line at a second pressure, supplying a second portion of the flow of fuel from the pump to a fuel shut-off valve, supplying a third portion of the flow of fuel from the pump to a first opening of a bypass valve at a third pressure, supplying a fourth portion of the flow of fuel at a third pressure from a solenoid valve to a second opening of the bypass valve, moving a piston in response to the third portion of the flow of fuel or the fourth portion of the flow of fuel being supplied to the bypass valve where the piston moves between a first position, a second position, and a third position, where the flow of fuel is blocked from entering the piston when the piston is in the first position, where the flow of fuel flows through a third opening in the bypass valve when the piston is in the second position, and where the flow of fuel flows through a fourth opening in the bypass valve when the piston is in the third position.

DETAILED DESCRIPTION

This disclosure relates to a fuel supply system used in a gas turbine engine. The fuel supply system is designed to use a series of valves in order to quickly cut off a supply of fuel to gas turbine engine injection nozzles. To cut off the supply of fuel, the system uses a bypass valve that is able to redirect fuel from a path leading to the nozzles to a recirculation circuit. The system is able to quickly cut off the supply of fuel to the nozzles. This can be important in order to quickly shut down the engine in situations where the engine shaft is rotating too fast. In order to better understand the claims herein a non-limiting embodiment of this disclosure is described below.

Figure 1A:
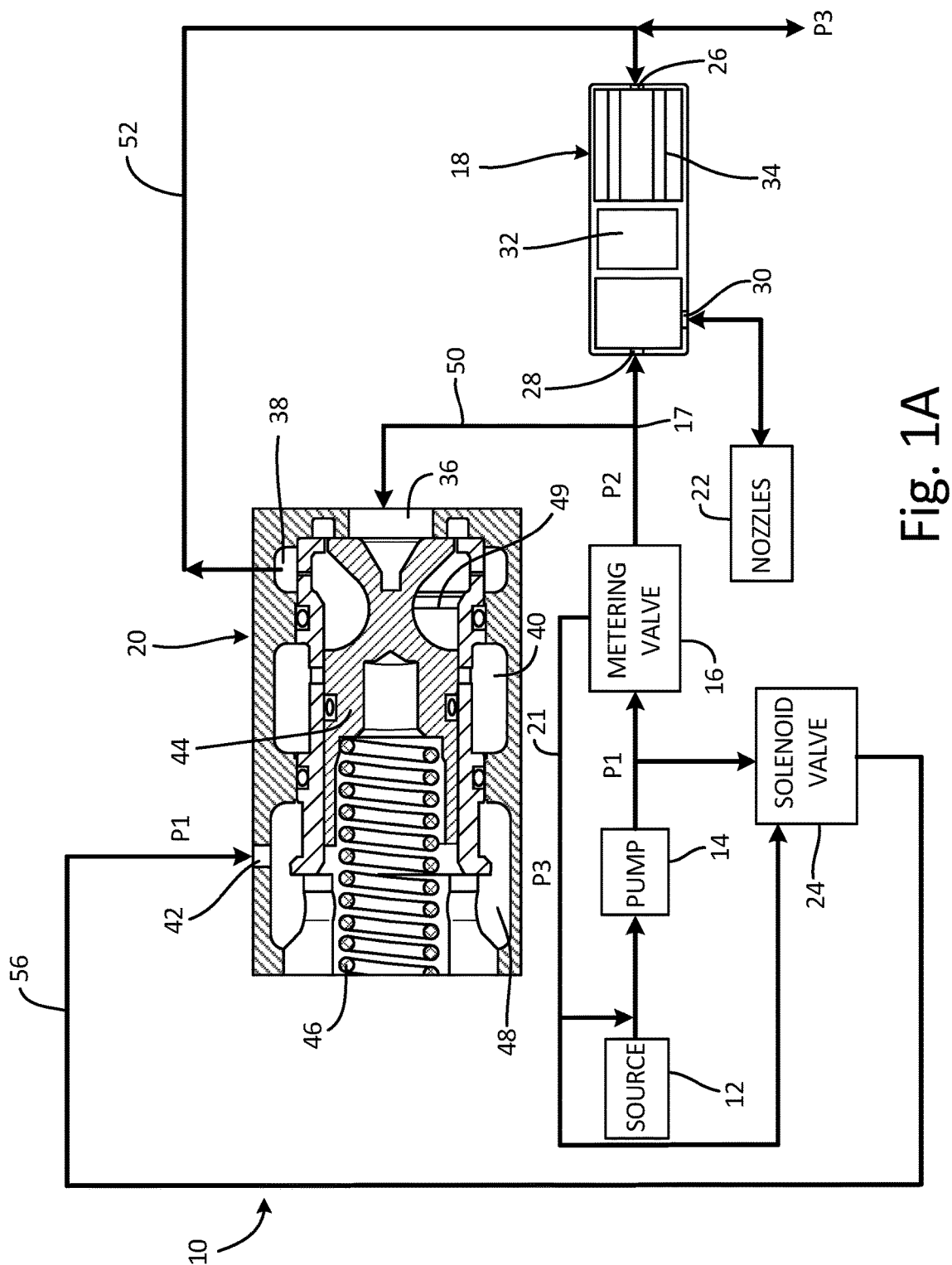
FIG. 1A is a schematic view of a fuel supply system in a run mode.

FIG. 1A is a schematic view of a fuel supply system in a run mode. Fuel system 10 includes fuel source 12, pump 14, metering valve 16, shut-off valve 18, windmill-bypass valve 20, which is shown in cross section, recirculation circuit 21, nozzles 22, and solenoid valve 24. Shut-off valve 18 includes first opening 26, second opening 28, outlet 30, piston 32, and spring 34. Windmill-bypass valve 20 includes first opening 36, second opening 38, third opening 40, fourth opening 42, piston 44, spring 46, solenoid flow chamber 48, and flow chamber 49.

Fuel source 12 is connected to pump 14. Pump 14 pumps fuel from fuel source 12 through system 10 into nozzles 22, which deliver the fuel to a combustor (not shown). Pump 14 is connected to metering valve 16. Metering valve 16 takes fuel from pump 14 and distributes a portion of the fuel to nozzles 22. Metering valve 16 is connected to shut-off valve 18 and windmill-bypass valve 20. Shut-off valve 18 allows the flow of fuel to nozzles 22 or cuts off the flow of fuel to nozzles 22 in order to shut down the gas turbine engine. Recirculation circuit 21 runs between metering valve 16 and a location upstream of pump 14. Recirculation circuit 21 sends fuel that is not supplied to nozzles 22 back to a location upstream of pump 14 so that the fuel can be redelivered through system 10. Shut-off valve 18 is further connected to nozzles 22. Metering valve 16 is further connected to solenoid valve 24. Windmill-bypass valve 20 supplies excess fuel to recirculation circuit 21 and sends fuel to the back side of shut-off valve 18 in order to close valve 18 and cut off the supply of fuel to nozzles 22. Windmill-bypass valve 20 includes flow chamber 49, which defines first opening 36, second opening 38, and third opening 40. Solenoid chamber 48 of windmill-bypass valve 20 defines fourth opening 42 and contains spring 46. Piston 44 is connected to spring 46 and is disposed within windmill-bypass valve 20. Piston 44 separates flow chamber 49 and solenoid chamber 48.

In operation, fuel is pumped from source 12 through system 10 by pump 14. Source 12 can be a fuel tank and pump 14 can be a gear pump driven by rotation of an engine shaft (not shown). Pump 14 pressurizes the fuel to a first pressure $P_1$ and delivers the fuel to metering valve 16. Metering valve 16 divides the flow of fuel into a flow of fuel to windmill-bypass valve 20 and shut-off valve 18 at a second pressure $P_2$ and a flow of fuel to recirculation circuit 21 at third pressure $P_3$. The fuel pressures $P_1$, $P_2$ and $P_3$ satisfy the following relationship: $P_3<P_2<P_1$.

The recirculation circuit fuel is routed through recirculation circuit 21 to a location upstream of pump 14 in order to be redelivered through system 10. Metering valve 16 separates recirculation circuit fuel from windmill-bypass valve and shut-off valve fuel so as not to supply nozzles 22 with excess fuel. Excess fuel is fuel not needed by the nozzles to support combustion in the gas turbine engine. After passing through metering valve 16, the windmill-bypass valve and shut-off valve fuel is divided into a first portion and a second portion at split 17.

The first portion of windmill-bypass valve and shut-off valve fuel is routed towards first opening 36 of windmill-bypass valve 20 and the second portion of windmill-bypass valve and shut-off valve fuel is routed towards second opening 28 of shut-off valve 18. In FIG. 1A, the first portion of fuel is not able to enter windmill-bypass valve 20 because piston 44 is in the first (closed) position, which causes first opening 36 to be blocked. Piston 44 is held in the first position by the operation of solenoid valve 24, which delivers a flow of fuel at pressure $P_1$ through fourth opening 42 into solenoid chamber 48. Because the pressure ($P_2$) of windmill-bypass valve and shut-off valve fuel is lower than $P_1$, piston 44 is held in the first position.

Shut-off valve 18 is held in a first open position by the windmill-bypass valve and shut-off valve fuel. This is because windmill-bypass valve and shut-off valve fuel, supplied through second opening 28, has a pressure ($P_2$) greater than recirculation circuit fuel at pressure $P_3$ supplied through first opening 26. Thus, spring 34 is compressed. As spring 34 is compressed, piston 32, which is attached to spring 34, is moved so that piston 32 does not block opening 30 and windmill-bypass valve and shut-off valve fuel can be routed to nozzles 22 of a combustor. Recirculation circuit fuel is supplied to first opening 26 through recirculation circuit 21.

Figure 1B:
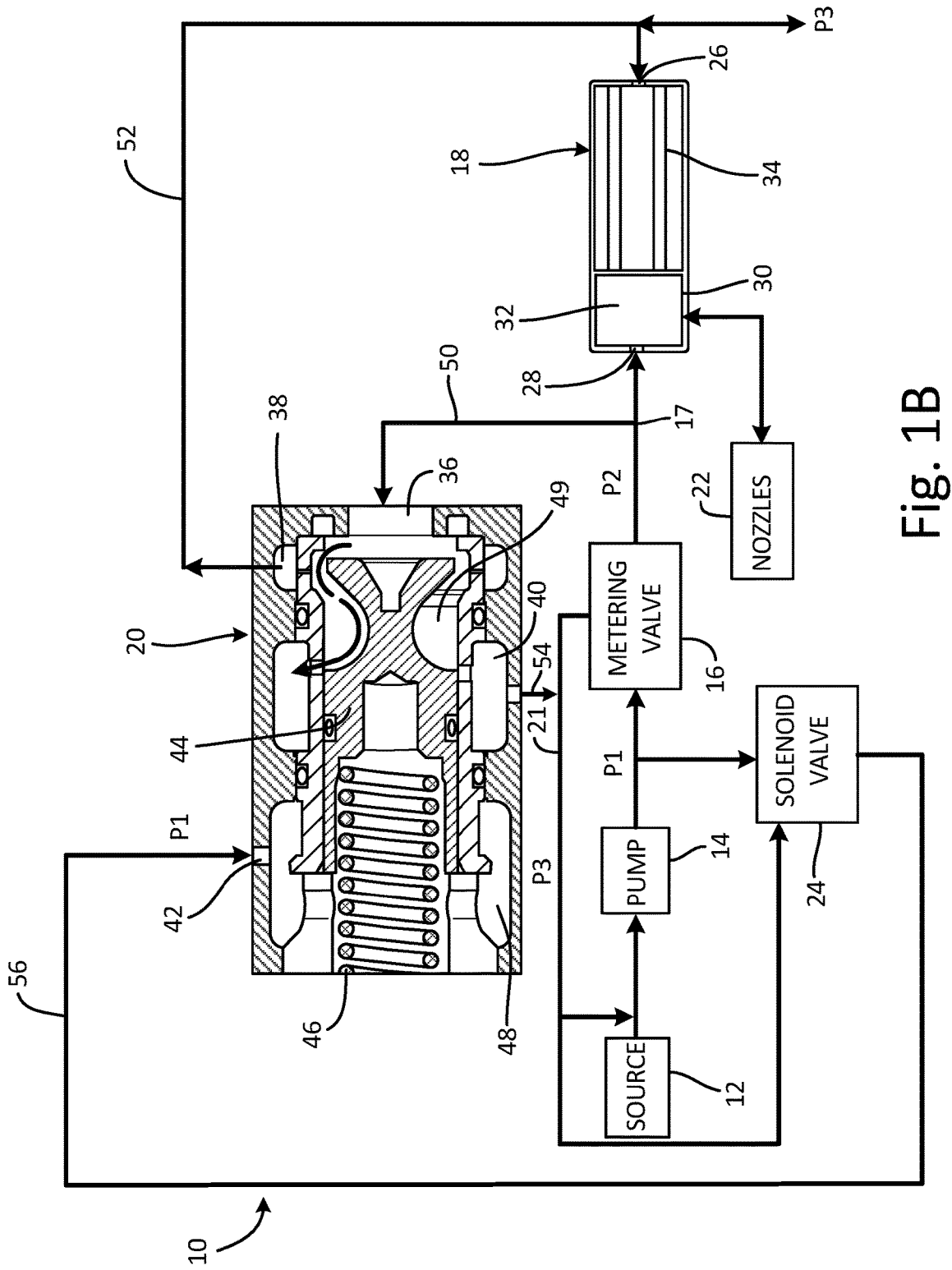
FIG. 1B is a schematic view of the fuel supply system in a shut-down mode.

FIG. 1B is a schematic view of fuel supply system 10 in a shut-down mode. FIG. 1B shows many of the same components shown in FIG. 1A. In shut-down mode, piston 32 of shut-off valve 18 is moved into a second (closed) position that blocks the passage of windmill-bypass valve and shut-off valve fuel to nozzles 22. This is accomplished by switching solenoid valve 24 from delivering a $P_1$ fuel through fourth opening 42 to delivering recirculation circuit fuel through fourth opening 42 into solenoid chamber 48 at pressure $P_3$. As stated above, pressure $P_3$ of recirculation circuit fuel is lower than the pressure $P_2$. This results in piston 44 being moved to an open position where windmill-bypass valve and shut-off valve fuel enters first opening 36 and flows into flow chamber 49 of windmill-bypass valve 20.

The windmill-bypass valve and shut-off valve fuel exits windmill-bypass valve 20 through second opening 38 and third opening 40. The windmill-bypass valve and shut-off valve fuel exiting through second opening 38 enters first opening 26 of shut-off valve 18. Thus, piston 32 has windmill-bypass valve and shut-off valve fuel at pressure $P_2$ on each side (front and back). Under these conditions, spring 34 decompresses to drive piston 32 to the closed position, thus preventing any flow of $P_2$ fuel through shut-off valve 18 to nozzles 22. Excess windmill-bypass valve and shut-off valve fuel, dispensed by metering valve 16, joins recirculation circuit 21 through third opening 40.

Solenoid valve 24 largely controls whether fuel is ultimately delivered to nozzles 22. That is, the position of second piston 32 is ultimately controlled by whether pressure $P_1$ fuel (directly from pump 14) or pressure $P_3$ fuel (from recirculation circuit 21) is delivered to solenoid chamber 48 of windmill-bypass valve 20. As shown in FIGS. 1A and 1B, solenoid valve 24 is configured to receive both $P_1$ fuel from a location downstream of pump 14 and $P_3$ fuel from recirculation circuit 21.

Solenoid valve 24 is an electromechanically operated valve that is controlled by an electric current sent to a valve 24 by a FADEC or EEC (not shown) that is able to interpret data relating to shaft rotation speed and determine whether the gas turbine engine needs to be shut down. Solenoid valve 24 can be a three-port valve in which a first port receives $P_1$ fuel, a second port receives recirculation circuit fuel, and a third port is connected to fourth opening 42 of windmill-bypass valve 20. An actuation element such as a plunger is disposed between the first port and the second port to selectively send either fuel at pressure $P_1$ or pressure $P_3$ to windmill-bypass valve 20 in response to the current sent by the FADEC or EEC.

Figure 2A:
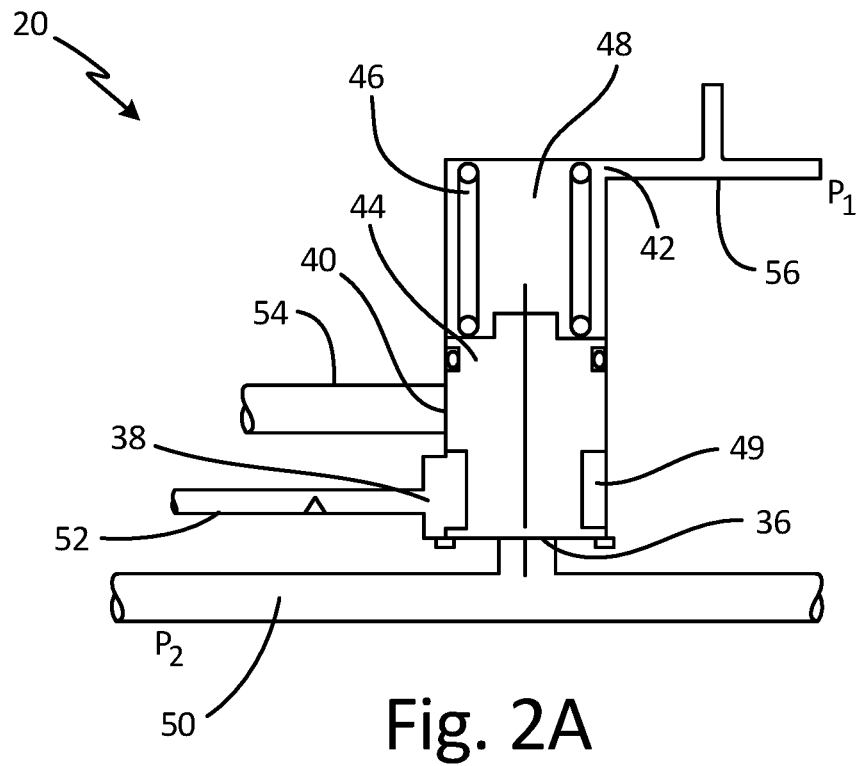
FIG. 2A is a sectional view of a windmill bypass valve in a closed position.

FIG. 2A is a schematic view of windmill-bypass valve 20 in the closed position. FIG. 2A shows many of the same components as shown above with respect to FIGS. 1A and 1B. FIG. 2A additionally shows line 50, line 52, line 54, and line 56. Line 50 connects metering valve 16 to first opening 36 of windmill-bypass valve 20 as well as second opening 28 of shut-off valve 18. Line 52 connects second opening 38 of windmill-bypass valve 20 to first opening 26 of shut-off valve 18. Line 54 connects third opening 40 of windmill-bypass valve 20 to recirculation circuit 21. Line 56 connects solenoid valve 24 to fourth opening 42 of windmill-bypass valve 20.

In operation, windmill-bypass valve and shut-off valve fuel flows though line 50 and through first opening 36 where the windmill-bypass valve and shut-off valve fuel is blocked by piston 44. Piston 44 is held in the first position by the higher pressure of the $P_1$ fuel delivered to the backside of piston 44 through solenoid line 56. Because the windmill-bypass valve and shut-off valve fuel is blocked from entering windmill-bypass valve 20, the windmill-bypass valve and shut-off valve fuel continues to flow towards nozzle 22 through shut-off valve 18 as described above with respect to FIG. 1A.

Figure 2B:
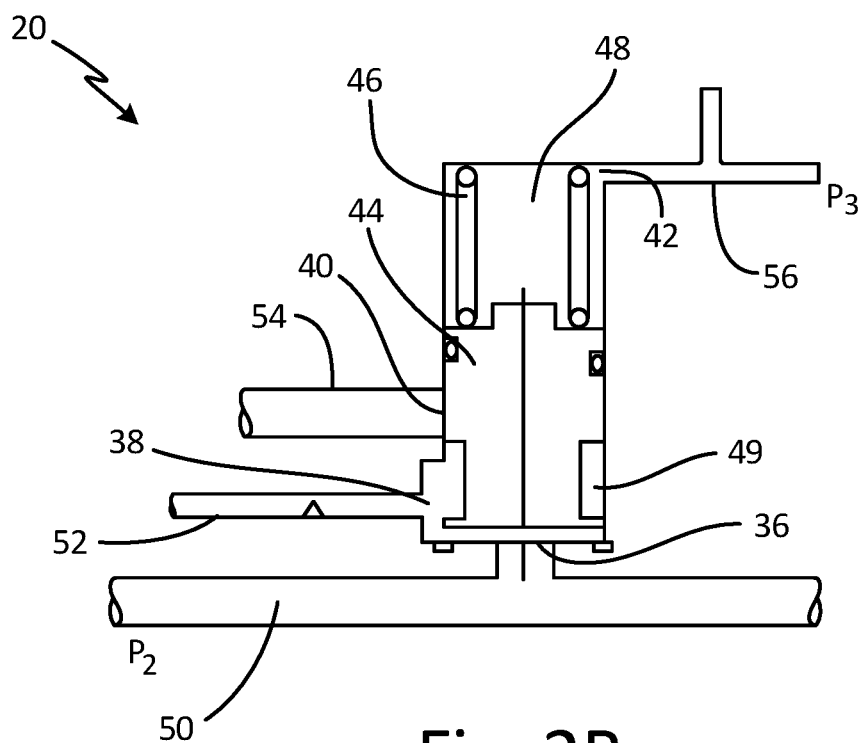
FIG. 2B is a sectional view of the windmill bypass valve in a first open position.

FIG. 2B is a schematic view of windmill-bypass valve 20 showing piston 44 in a second position. As shown, solenoid flow chamber 48 is filled with recirculation circuit fuel. As stated above, recirculation circuit fuel has a lower pressure ($P_3$) than windmill-bypass valve and shut-off valve fuel ($P_2$). The pressure differential across piston 44 results in piston 44 moving into the second position. As piston 44 moves into the second position spring 46 is compressed and first opening 38 is exposed thus allowing the windmill-bypass valve and shut-off valve fuel to exit first opening 38 and flow towards shut-off valve 18 through shut-off valve transport line 52.

Figure 2C:
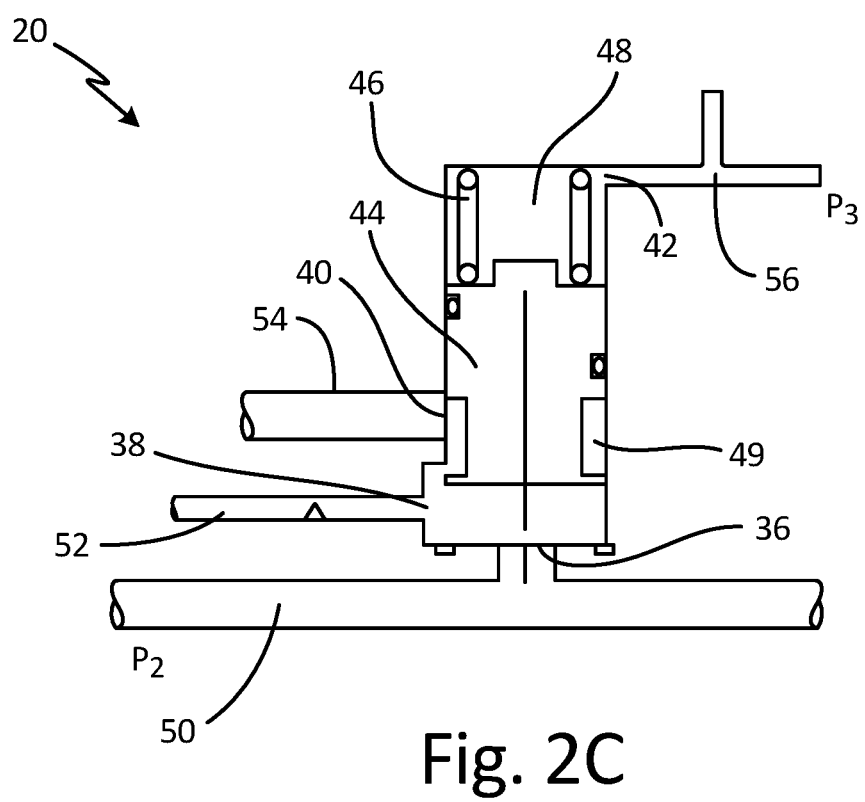
FIG. 2C is a sectional view of the windmill bypass valve in a second open position.

FIG. 2C is a schematic view of windmill-bypass valve 20 in a third position. As shown, solenoid flow chamber 48 continues to be filled with recirculation circuit fuel at pressure $P_3$. Thus, piston 44 continues to move upwards (in FIG. 2C), eventually exposing third opening 40 to the windmill-bypass valve and shut-off valve fuel flow. The windmill-bypass valve and shut-off valve fuel thus exits windmill-bypass valve 20 through third opening 40 where it joins the recirculation circuit fuel through bypass flow line 54. Windmill-bypass valve and shut-off valve fuel also exits windmill-bypass valve 20 through first opening 38 as described above with respect to FIG. 2B.

Windmill-bypass valve 20 allows fuel to exit through third opening 40 in order to relieve pressure in both windmill-bypass valve 20 and shut-off valve 18. That is, when windmill-bypass valve and shut-off valve fuel is delivered to shut-off valve 18 through line 52, pressure builds inside windmill-bypass valve 20 and exceeds pressure $P_2$. This is because windmill-bypass valve and shut-off valve fuel continues to be supplied to windmill-bypass valve 20 until the gas turbine engine is shut down. When piston 44 moves into the third position, fuel in flow chamber 49 can exit windmill-bypass valve 20 though opening 40 thus relieving the excess pressure built up in flow chamber 49. In this manner the ability of piston 44 to move into the third position serves as a pressure relief mechanism.

There are many reasons to use fuel supply system 10. For example, fuel supply system 10 allows a gas turbine engine to be quickly shut down. That is, solenoid valve 24 can quickly deliver fuel at either of pressures $P_1$ or $P_3$ to windmill-bypass valve 20, which ultimately controls shut-off valve 18. The ability to quickly shut off a gas turbine engine can help to prevent damage to the engine caused by shaft shear. Shaft shear occurs when a shaft rotates above a threshold speed. This can result in the shaft deviating from its normal axis of rotation and impacting other structures in the gas turbine engine. This can damage the shaft and surrounding components.

An additional reason to use fuel supply system 10 is that system 10 uses fewer valves than current fuel supply systems. For example, some systems use a separate valve to send fuel to a shut-off valve to cut the supply of fuel to nozzles. Windmill-bypass valve 20, however, is able to combine the function of at least two valves. That is, windmill-bypass valve 20 sends fuel to shut-off valve 18 in order to move piston 32 into the second position closed position. Windmill-bypass valve 20, additionally, delivers fuel to recirculation circuit in order to be recirculated.

Designing windmill-bypass valve 20 to carry out the above described functions reduces system complexity, by reducing the number of valves, as well as reduces the overall weight of the system by including fewer components than current systems.

Discussion of Possible Embodiments

The following are non-exclusive descriptions of possible embodiments of the present invention.

A fuel management system can include a fuel source, a pump in communication with the fuel source, a shut-off valve in communication with the pump, a fuel nozzle in communication with and downstream from the shut-off valve, and a bypass valve in communication with the pump and the shut-off valve. The bypass valve can include a first chamber, a second chamber, a piston disposed between the first chamber and the second chamber and having a first end a second end and movable between a first position, a second position, and a third position, a first opening in communication with the pump and the first chamber, a second opening in communication with the shut-off valve and the first chamber, a third opening in communication with the pump and the first chamber; and a fourth opening in communication with the second chamber; and a solenoid valve in communication with the fourth opening.

The system of the preceding paragraph can optionally include, additionally and/or alternatively, any one or more of the following features, configurations, and/or additional components:

The system can further include a metering valve configured to direct a first portion of a flow of fuel from the pump to bypass valve and to direct a second portion of the flow of fuel from the pump to a recirculation circuit.

The system can further include a split downstream of the metering valve configured to direct a third portion of the flow of fuel from the first flow of fuel to the shut-off valve.

The solenoid valve can be configured to selectively deliver a flow of fuel at a first or second pressure to the fourth opening of the bypass valve.

The solenoid valve can be in communication with the recirculation circuit and the pump.

The shut-off valve can include a fifth opening in communication with the second opening of the bypass valve, a sixth opening in communication with the metering valve, an outlet, and a second piston disposed within the shut-off valve.

The second piston can be configured to move to a position where the outlet of the shut-off valve is closed when a pressure of the third portion of the flow of fuel fed into the second opening is greater than a pressure of a flow of fuel supplied from the second opening of the bypass valve to the first opening of the shut-off valve.

A gas turbine engine shut-down system can include a pump configured to draw a flow of fuel from a source, a fuel nozzle configured to receive the flow of fuel from the pump, a fuel shut-off valve in fluid communication with the pump, a recirculation circuit for circulating excess fuel to a location upstream of the pump; a solenoid valve in communication with the pump and the recirculation circuit; and a fuel-bypass valve. The fuel-bypass valve can include a first opening connected to the fuel pump, a second opening connected to the fuel shut-off valve, a third opening connected to the recirculation circuit, a fourth opening connected to the solenoid valve, and a piston disposed within the fuel-bypass valve and movable between a plurality of positions.

The system of the preceding paragraph can optionally include, additionally and/or alternatively, any one or more of the following features, configurations, and/or additional components:

The pump can be configured to pressurize the flow of fuel to a first pressure.

The recirculation circuit can be configured to receive the excess fuel at a pressure that is less than the first pressure.

The fuel shut-off valve can include a fifth opening connected to the first opening of the fuel-bypass valve, a sixth opening connected to the second opening of the fuel-bypass valve, an outlet connected to the fuel nozzle, and a second piston disposed within the shut-off valve.

The second piston can be configured to move into a first position blocking the outlet in response to a pressure of a flow of fuel supplied through the fifth opening being greater than a pressure of a flow of fuel supplied through the sixth opening.

The second piston can be configured to move into a second position allowing fuel to flow through the outlet in response to a pressure of flow of fuel supplied through the fifth opening being substantially equal to a pressure of a flow of fuel supplied through the sixth opening.

The solenoid valve can be configured to selectively deliver a flow of fuel from the pump or a flow of fuel from the recirculation circuit to the bypass valve.

A method for controlling a flow of fuel in a gas turbine engine can include pressurizing a flow of fuel with a pump, supplying the flow of fuel at a first pressure from the pump to a metering valve, supplying a first portion of the flow of fuel from the metering valve to a recirculation line at a second pressure, supplying a second portion of the flow of fuel from the pump to a fuel shut-off valve, supplying a third portion of the flow of fuel from the pump to a first opening of a bypass valve at a third pressure, supplying a fourth portion of the flow of fuel at a third pressure from a solenoid valve to a second opening of the bypass valve, moving a piston in response to the third portion of the flow of fuel or the fourth portion of the flow of fuel being supplied to the bypass valve where the piston moves between a first position, a second position, and a third position, where the flow of fuel is blocked from entering the piston when the piston is in the first position, where the flow of fuel flows through a third opening in the bypass valve when the piston is in the second position, and where the flow of fuel flows through a fourth opening in the bypass valve when the piston is in the third position.

The method of the preceding paragraph can optionally include, additionally and/or alternatively, any one or more of the following features, configurations, and/or additional components:

The method can further include supplying the second portion of the flow from the shut-off valve to a fuel nozzle.

The shut-off valve can include a piston movable between a first position and a second position wherein the shut off valve allows the flow of fuel to enter the fuel nozzle, when the piston is in the first position and wherein the shut off valve prevents the flow of fuel from entering the fuel nozzle, when the piston is in the second position.

The pressure of the flow of fuel on a front side of the shut-off valve piston can be substantially equal to the pressure of the flow of fuel on a backside of the shut-off valve piston when the piston is in the first position.

The pressure of the flow of fuel on a front side of the shut-off valve piston can be less than the pressure of the flow of fuel on a backside of the shut-off valve piston when the piston is in the second position.

The solenoid valve can be configured to selectively deliver a flow of fuel from the pump or a flow of fuel from the recirculation line to the bypass valve.

The invention claimed is:

1. A fuel management system comprising:
  a fuel source;
  a pump in communication with the fuel source;
  a shut-off valve in communication with the pump;
  a fuel nozzle in communication with and downstream from the shut-off valve;
  a bypass valve in communication with the pump and the shut-off valve, the bypass valve comprising:
    a first chamber;
    a second chamber;
    a first piston disposed between the first chamber and the second chamber and having a first end and a second end, the first piston movable between a first position, a second position, and a third position;
    a first opening in communication with the pump and the first chamber;
    a second opening in communication with the shut-off valve and the first chamber;
    a third opening in communication with the pump and the first chamber; and
    a fourth opening in communication with the second chamber; and
  a solenoid valve in communication with the fourth opening; and
  a metering valve configured to direct a first portion of a flow of fuel from the pump to the first opening of the bypass valve and to direct a second portion of the flow of fuel from the pump to a recirculation circuit and a third portion of the flow of fuel from the pump to the shut-off valve;
  wherein the shut-off valve comprises:
    a fifth opening in communication with the second opening of the bypass valve;
    a sixth opening configured to receive the third portion of the flow of fuel from the metering valve;
    an outlet in communication with the fuel nozzle; and
    a second piston disposed within the shut-off valve; and
    wherein the second piston is configured to move to a first position where the outlet of the shut-off valve is open when a pressure of the third portion of the flow of fuel fed into the sixth opening of the shut-off valve is greater than a pressure of a flow of fuel supplied from the second opening of the bypass valve to the fifth opening of the shut-off valve.

2. The fuel management system of claim 1, and further comprising:
  a split downstream of the metering valve configured to direct the third portion of the flow of fuel from the first portion of the flow of fuel to the shut-off valve.

3. The fuel management system of claim 1, wherein the solenoid valve is configured to selectively deliver a flow of fuel at a first or second pressure to the fourth opening of the bypass valve.

4. The fuel management system of claim 3, wherein the solenoid valve is in communication with the recirculation circuit and the pump.

5. The fuel management system of claim 1, wherein the second piston is configured to move into a second position where the outlet of the shut-off valve is closed when a pressure of the third portion of the flow of fuel fed into the sixth opening of the shut-off valve is substantially equal to a pressure of a flow of fuel supplied from the second opening of the bypass valve to the fifth opening of the shut-off valve.

6. A gas turbine engine shut-down system comprising:
  a pump configured to draw a flow of fuel from a source;
  a fuel nozzle configured to receive the flow of fuel from the pump;
  a fuel shut-off valve in fluid communication with the pump;
  a metering valve disposed between the pump and the fuel shut-off valve;
  a recirculation circuit for circulating excess fuel from the metering valve to a location upstream of the pump;
  a solenoid valve in communication with the pump and the recirculation circuit; and
  a fuel-bypass valve comprising:
    a first opening connected to the metering valve;
    a second opening connected to the fuel shut-off valve;
    a third opening connected to the recirculation circuit;
    a fourth opening connected to the solenoid valve; and
    a first piston disposed within the fuel-bypass valve and movable between a plurality of positions;
  wherein the fuel shut-off valve comprises:
    a fifth opening receiving a portion of the flow of fuel from the metering valve;

a sixth opening connected to the second opening of the fuel-bypass valve;
an outlet connected to the fuel nozzle; and
a second piston disposed within the fuel shut-off valve; and wherein the second piston is configured to move into a first position allowing fuel to flow through the outlet in response to a pressure of the flow of fuel supplied from the metering valve through the fifth opening of the fuel shut-off valve being greater than a pressure of a flow of fuel supplied from the second opening of the fuel-bypass valve through the sixth opening of the fuel shut-off valve.

7. The gas turbine engine shut-down system of claim 6, wherein the pump is configured to pressurize the flow of fuel to a first pressure.

8. The gas turbine engine shut-down system of claim 7, wherein the recirculation circuit is configured to receive the excess fuel at a pressure that is less than the first pressure.

9. The gas turbine engine shut-down system of claim 6, wherein the second piston is configured to move into a second position blocking the outlet in response to a pressure of the flow of fuel supplied from the fuel metering valve through the fifth opening of the shut-off valve being substantially equal to a pressure of the flow of fuel supplied from the second opening of the fuel-bypass valve through the sixth opening of the shut-off valve.

10. The gas turbine shut-down system of claim 6, wherein the solenoid valve is configured to selectively deliver a flow of fuel from the pump or a flow of fuel from the recirculation circuit to the fuel-bypass valve.

11. A method for controlling a flow of fuel in a gas turbine engine using the gas turbine engine shut-down system of claim 6, the method comprising:
pressurizing the flow of fuel with the pump;
supplying the flow of fuel at a first pressure from the pump to the metering valve;
supplying a first portion of the flow of fuel from the metering valve to the recirculation line at a second pressure;
supplying a second portion of the flow of fuel from the metering valve to the fuel shut-off valve;
supplying a third portion of the flow of fuel from the metering valve to the first opening of the fuel-bypass valve at a third pressure;
supplying a fourth portion of the flow of fuel at a fourth pressure from the solenoid valve to the fourth opening of the fuel-bypass valve;
moving the first piston in response to the third portion of the flow of fuel or the fourth portion of the flow of fuel being supplied to the fuel-bypass valve;
wherein the first piston moves between a first position, a second position, and a third position;
wherein the flow of fuel is blocked from entering the first opening when the first piston is in the first position;
wherein the flow of fuel flows through the third opening in the fuel-bypass valve when the first piston is in the second position; and
wherein the flow of fuel flows through the fourth opening in the fuel-bypass valve when the first piston is in the third position.

12. The method of claim 11, and further comprising:
supplying the second portion of the flow of fuel from the shut-off valve to the fuel nozzle.

13. The method of claim 12, wherein the shut-off valve includes the second piston movable between the first position and a second position, wherein the shut-off valve allows the flow of fuel to enter the fuel nozzle when the second piston is in the first position, and wherein the shut-off valve prevents the flow of fuel from entering the fuel nozzle when the second piston is in the second position.

14. The method of claim 13, wherein the second piston is in the first position when the pressure of the flow of fuel into the fifth opening on a front side of the second piston is substantially equal to the pressure of the flow of fuel into the sixth opening on a backside of the second piston.

15. The method of claim 14, wherein the second piston is in the second position when the pressure of the flow of fuel into the fifth opening on a front side of the second piston is less than the pressure of the flow of fuel into the sixth opening on a backside of the second piston.

16. The method of claim 11, wherein the solenoid valve is configured to selectively deliver a flow of fuel from the pump or a flow of fuel from the recirculation line to the fuel-bypass valve.

* * * * *